US005950296A

United States Patent [19]

Tatsumi et al.

[11] Patent Number: 5,950,296

[45] Date of Patent: Sep. 14, 1999

[54] COMBINATION OF A CONTAINER AND AN UNLOCKING TOOL FOR THE CONTAINER

[75] Inventors: Yoshikazu Tatsumi, Bloomingdale; Lucian Predescu, Chicago, both of Ill.

[73] Assignee: Matsushita Industrial Equipment Corp. of America, Elmhurst, Ill.

[21] Appl. No.: 08/975,640

[22] Filed: Nov. 21, 1997

[51] Int. Cl.[6] .......................... B25B 27/02; B23P 17/00; A45C 11/00

[52] U.S. Cl. .......................... 29/426.5; 206/37; 292/84; 81/3.55; 81/3.57

[58] Field of Search .......................... 29/426.5, 426.1, 29/267; 81/3.55, 3.57; 206/387.11, 1.5, 37; 70/57.1, 63; 292/80, 81, 84, 107

[56] References Cited

U.S. PATENT DOCUMENTS

| | | | |
|---|---|---|---|
| 4,334,376 | 6/1982 | Winslow | 29/267 |
| 4,780,942 | 11/1988 | Bernat | 29/267 |
| 4,829,619 | 5/1989 | Edgerton | 81/3.55 |

FOREIGN PATENT DOCUMENTS

| | | | |
|---|---|---|---|
| 3012524 | 10/1981 | Germany | 29/267 |

*Primary Examiner*—S. Thomas Hughes
*Assistant Examiner*—Jermie E. Cozart
*Attorney, Agent, or Firm*—Brinks Hofer, Gilson & Lione

[57] ABSTRACT

An unlocking tool for opening a container operates by the action of a lever. The container includes a first half and a second half connected to each other for rotation. The first half includes a latch finger, and the second half has a hole for receiving the latch finger and engaging with it to keep the container closed. The second half also includes a second hole adjacent to the first hole for suspension of said container. The unlocking tool of the invention functions as a lever along which the tool has an effort point, a fulcrum and an acting point. The tool is formed to pass in part through the second hole of the second half and rotate around the fulcrum positioned in the second hole. When the tool is rotated around the fulcrum positioned in the second hole, the acting point of the tool urges the latch finger to release the engagement between the latch finger and the first hole of the second member, thereby opening the container.

9 Claims, 3 Drawing Sheets

COMBINATION OF A CONTAINER AND AN UNLOCKING TOOL FOR THE CONTAINER

BACKGROUND OF THE INVENTION

1. Field of the Invention

This invention pertains to an unlocking tool for opening a container and, more particularly, to an unlocking tool for a container housing a thermoluminescent dosimetry (TLD) badge for radiation dosimetry.

The law requires personnel who work in a radiation field, such as a nuclear power station, to carry a TLD badge for the purpose of monitoring radiation dose sustained by the personnel while they are in the field. The TLD badges must actually be worn by the personnel so that the badges will be exposed to the same amount and type of radiation. FIGS. 1 and 2 respectively show a container 1 for a TLD badge and the TLD badge 50 housed in the container 1. The container 1 is generally in the form of a thin rectangular box and, as shown in FIG. 1, has three trapezoidal tabs 2, 3 and 4: one on each of the lateral sides; and one on a longitudinal side. The tabs 2, 3 and 4 are provided with slots 5, 6 and 7 so that the container 1 can be conveniently worn by the personnel. Since those personnel usually carry an ID card, each slot is so dimensioned that an ID card strap for attaching the ID card onto a chest pocket can pass through the slot and suspend the container 1 from the ID card. Which slot is to be used for suspension of the container is sometimes at carrier's choice and sometimes specified by regulations peculiar to the radiation field where the carriers work.

As shown in FIG. 2, the TLD badge 50 consists of a case 51 and a rectangular TLD plate 52 inserted in the case 51. In the example shown in FIG. 2, the TLD plate 52 has four thermoluminescent (TL) elements 53 arranged along its length. Those elements 53 are made of a thermoluminescent material, such as $CaSO_4$ or $Li_2B_4O_7$, which stores radiation energy inside when exposed to radiation. The case 51 has four windows 54 of different thicknesses each located in a position corresponding to one of the TL elements 53. Thus, each TL element is covered by its own unique window which provides different radiation absorption thicknesses to allow estimation of radiation dose for various organs at risk. The badge 50 may be provided with a machine readable code to enable automatic identification of a person who wore the badge.

When entering a radiation field, each person is given the container 1 with the TLD badge 50 in it. They wear the containers 1 while in the field and give the containers 1 back when leaving the field. The containers 1 are thereafter collected in one place where they are opened to remove the TLD badges 50. The removed TLD badges are then processed by a TLD reader for dosimetry reading. FIG. 3 shows such a TLD reader.

When heated by a tungsten lamp 55, the TL elements 53 emit light at an intensity and for an interval of time correlatable to the amount of radiation sensed by the elements. A photo multiplier tube 56 detects the illumination from the TL elements 53 and transmits an electrical signal to a readout device of the TLD reader.

2. Description of the Related Art

Turning back to the container 1, FIG. 4 is a cross sectional view showing the container 1 in the closed position, and FIG. 5 is a perspective view showing the container 1 in an open position. As mentioned above, the container 1 is generally in the form of a thin rectangular box made of a plastic and includes top and bottom halves 8 and 9. The top and bottom halves 8 and 9 are connected at their longitudinal ends 8*a* and 9*a* by a hinge 10 for rotation with respect to each other. The halves 8 and 9 are rotated around the hinge 10 and closed along their respective edges to form therebetween a space for accommodating the TLD badge 50.

The top half 8 has tabs 3*a* and 4*a* on its lateral sides 8*b* and 8*c*. Similarly, the bottom half 9 has tabs 3*b* and 4*b* on its lateral sides 9*b* and 9*c*. In addition, the bottom half 9 has the trapezoidal tab 2 on its longitudinal side 9*d*. When the container 1 is closed, the tabs 3*a* and 3*b* are joined to form the trapezoidal tab 3 in FIG. 1. The tabs 4*a* and 4*b* likewise form the trapezoidal tab 4 in the FIG. 1 when the container 1 is closed. When the container 1 is closed, it is sealed by an annular rubber seal 11.

The container 1 is equipped with a locking mechanism to keep itself closed. Specifically, the top half 8 has on a longitudinal side 8*d* a latch finger 12 extending perpendicularly to the plane dividing the container 1 into the top and bottom halves 8 and 9. As shown in FIG. 4, the latch finger 12 has a wedge-shaped end portion including a slant surface 12*a* and a holding edge 12*b*. On the other hand, the tab 2 of the bottom half 9 is provided with a smaller slot 13 adjacent to the slot 5. When the container 1 is being closed, the latch finger 12 passes through the slot 13 and engages therewith to lock up the halves 8 and 9 together.

To facilitate a description and understanding of the invention disclosed here, the locking mechanism is described in detail. When the container 1 is being closed, the slant surface 12*a* of the latch finger 12 first comes in contact with the periphery of the slot 13. The top and bottom halves 8 and 9 are then pressed against each other. As the halves 8 and 9 are pressed against each other, the latch finger 12 is bent towards the hinge 10 and advances into the slot 13. At the same time, the periphery of that slot 13, keeping in contact with the slant surface 12*a*, is moving up on the surface 12*a* towards the holding edge 12*b*. At that point in time when the slot 13 reaches the holding edge 12*b*, the latch finger 12 snaps back to the perpendicular position, so that the holding edge 12*b* catches the slot 13. Once the container 1 is closed, the top and bottom halves are locked up together by the engagement between the holding edge 12*b* and the slot 13. To open the container 1, the latch finger 12 must be bent to release the engagement between the holding edge 12*b* and the slot 13.

The above engagement between the holding edge 12*b* and the slot 13 must be very tight to keep the container 1 closed against various unintended external forces, such as a drop impact exerted when the container 1 falls off to the ground accidentally. If the container 1 opens while in use, radiation dosimetry is no longer accurate. To prevent the container 1 from opening by accident, the latch finger 12 is formed very stiff and cannot be bent easily. Therefore, a special unlocking tool is necessary to release the engagement between the holding edge 12*b* and the slot 13 in order to open the container 1.

FIG. 6 shows one of the prior art tools which has been used for opening the container 1. As shown in FIG. 6, the tool is a rectangular plate 20 having a pushing finger 21 and a deep notch 22 adjacent to the pushing finger 21. In use, an operator holds the container 1 in one hand and the tool 20 in the other hand and inserts the tab 2 of the container 1 into the deep notch 22 as shown in FIG. 7 until the pushing finger 21 abuts against the slant surface 12*a* of the latch finger 12. The operator then pushes the tool 20 against the container 1. When the tool 20 is pushed against the container 1, the pushing finger 21 pushes the slant surface 12*a* and thus bends the latch finger 12 towards the hinge 10, thereby releasing the engagement between the holding edge 12*b* and the slot 13.

But the actual use of this tool 20 is not so easy as it appears to be. First of all, an intensive force is required to bend the stiff latch finger 12 when the tool 20 is pushed against the container 1. Since one operator usually has to open hundreds of the containers 1 during a work shift, he could not complete his job without hurting his hands unless he protects his hands with special gloves. Also, the use of the tool 20 requires special skills. The pushing finger 21, when pushed against the slant surface 12*a*, tends to slip up along the surface 12*a* and cannot effectively push the surface. The operator therefore has to push the tool 20 against the container 1 without causing any relative movement between the pushing finger 21 and the slant surface 12*a*.

FIG. 8 shows prior art of another type which has been used to open the container 1. In FIG. 8, an unlocking tool 30 includes two identical plates 31 and 32 each having the shape of the letter "C". These two plates 31 and 32 are secured to each other by bolts 33 with a space between them. The space between the plates 31 and 32 is slightly wider than the thickness of the tabs 3 and 4 of the container 1. The distance D between the arms of each plate is slightly wider than the width W, shown in FIG. 1, of the container 1. The plate 31 has a bolt 34 screwed at the center of its yoke. The head of the bolt 34 (not shown) is located between the plates 31 and 32. The plate 32 is provided at the center of the yoke with a projection 32*a* extending in parallel to the arms of the plate 32. As shown in FIG. 8, the projection 32*a* is inclined over an angle with respect to the plate 32. In use, an operator inserts the container 1 between the arms of the tool 30. The tabs 3 and 4 of the container 1 are also inserted between the plates 31 and 32. The container 1 is inserted until the slant surface 12*a* of the latch finger 12 abuts against the projection 32*a*. The operator then pushes the container 1 against the tool 30. When pushed against the slant surface 12*a*, the projection 32*a* pushes and bends the latch finger 12, thereby releasing the engagement between the holding edge 12*b* and the slot 13.

The tool 30 is easier to use than the tool 20 discussed above because the operator does not have to worry about positioning of the container 1 with respect to the tool 30. The lateral movement of the container 1 is restricted by the arms of the tool. Vertical movement of the container 1 is also restricted because the tabs 3 and 4 are located between the plates 31 and 32. In addition, when the projection 32*a* abuts against the slant surface 12*a*, the tab 2 of the container 1 comes right under the head of the bolt 34. When the container 1 is pushed against the tool 30, the head of the bolt 34 abuts against the tab 2 and restricts the latch finger 12 from moving upward and away from the projection 32*a*. However, the tool 30 still requires on intensive force to bend the stiff latch finger 12 when the container 1 is pushed against the tool 30.

SUMMARY OF THE INVENTION

It is therefore an object of the present invention to provide an unlocking tool for the container 1 which requires very little force to open the container 1 and virtually no effort to maintain the proper position of the tool with respect to the container 1.

An unlocking tool in accordance with the present invention is used to open a container by the action of a lever. As described above, the container includes a first member and a second member each having a first end and a second end. The first and second members are connected at their first ends for rotation with respect to each other to close and open the container. The first member has at its second end a latch finger. On the other hand, the second member has at its second end a first hole for receiving said latch finger and engaging therewith to keep the container closed. The second member also has a second hole adjacent to the first hole for suspension of the container The unlocking tool of the present invention comprises a rigid piece formed to pass in part through the second hole of the second member. The rigid piece defines a lever along which it has an effort point at which force is applied, a fulcrum around which said rigid piece is rotated by the application of a force at said effort point, and an acting point at which work is done by the rotational movement of said rigid piece. The rigid piece includes a positioning device for positioning the fulcrum in the second hole. The rigid piece also includes an urging device for urging the latch finger when the rigid piece is rotated around the fulcrum positioned in the second hole in order to release the engagement between the latch finger and the first hole of the second member.

In the present invention, the acting point may be located between the fulcrum and the effort point.

The positioning device of the unlocking tool according to the present invention may include a curved end portion formed to pass through the second hole and hook on the periphery of the hole to hold itself in the hole against force exerted in the direction along the lever. The positioning device may further include at least one stopper for abutting against the container to limit insertion of the curved end portion into the second hole. The curved end portion may be curved over about 45 degrees with respect to a plane extending along the lever and perpendicular to a plane in which the rigid piece rotates. The above urging device may include a projection for pushing the latch finger to release the engagement between the latch finger and the first hole of the second member.

In a preferred embodiment, the rigid piece is generally in the shape of a rectangular plate having along its length a first end and a second end. The rectangular plate has the acting point adjacent to the first end and the effort point at the second point. The rectangular plate is larger in cross section than the second hole of the second member. The positioning device includes a curved plate attached to the first end of the rectangular plate and defines the fulcrum at the junction between the curved plate and the rectangular plate. The curved plate is formed to pass through the second hole and hook on the periphery of the hole to hold itself in the hole against force exerted in the direction along the lever.

In this preferred embodiment, the positioning device further includes at least one stopper created at the junction between the curved plate and the rectangular plate due to the difference in cross section therebetween. The stopper abuts against the periphery of the second hole to limit insertion of the curved plate into the second hole. The urging device includes a projection for pushing the latch finger to release the engagement between the latch finger and the first hole of the second member.

Also, in this preferred embodiment, the curved plate may be curved over about 45 degrees with respect to the rectangular plate.

The present invention also provides a method of opening the container 1 by the action of a lever. The method comprises the steps of inserting into the second hole of the second member a lever having an effort point at which force is applied, a fulcrum around which said lever is rotated by the application of a force at said effort point and an acting point at which work is done by the rotational movement of said lever. The fulcrum is then positioned in the second hole. The lever is then rotated around said fulcrum positioned in the second hole so that the acting point will urge the latch finger to release the engagement between the latch finger and the first hole of the second member.

DETAILED DESCRIPTION OF THE DRAWINGS AND THE PREFERRED EMBODIMENT

Figure 1:
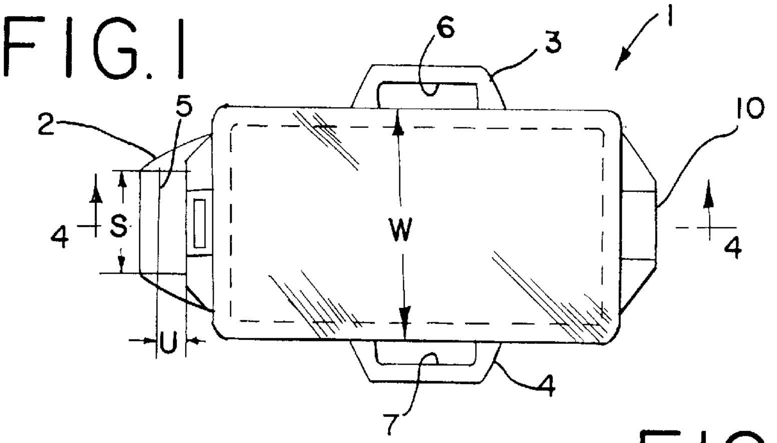
FIG. 1 is a plan view showing a container for TLD badges.
Figure 2:
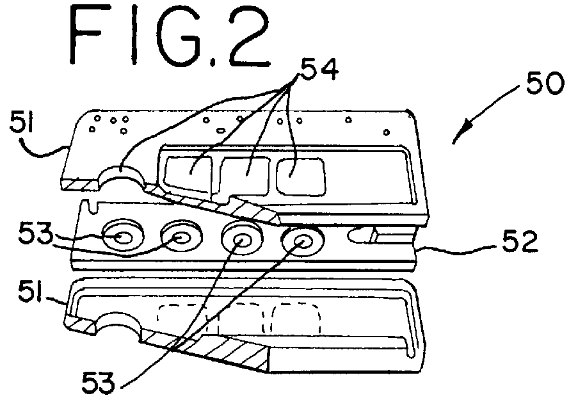
FIG. 2 is a partially broken view showing a TLD badge.
Figure 3:
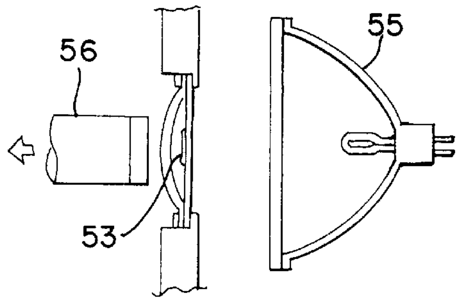
FIG. 3 is a schematic view showing a TLD reader.
Figure 4:
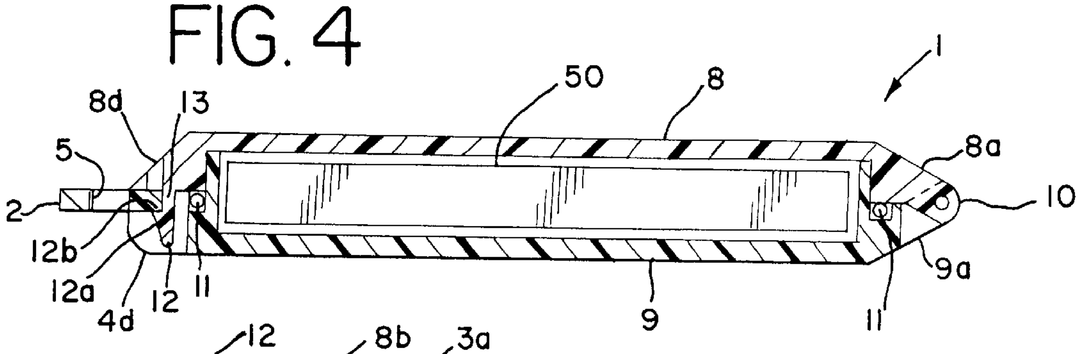
FIG. 4 is a cross-sectional view of the container taken along the line 4—4 of FIG. 1.
Figure 5:
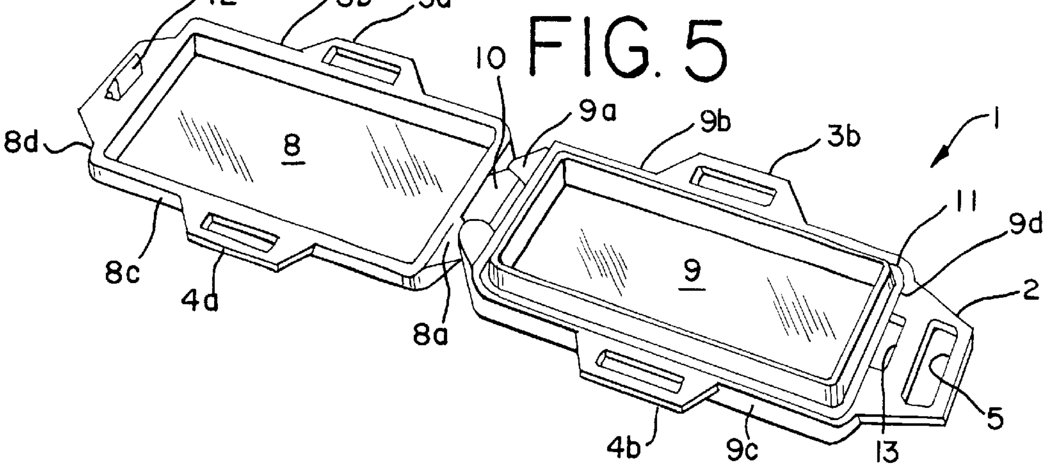
FIG. 5 is a perspective view showing the container of FIG. 1 in an open position.
Figure 6:
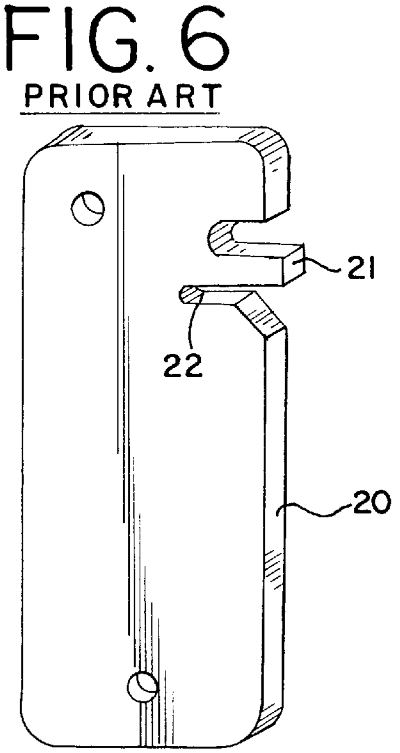
FIG. 6 PRIOR ART
FIG. 6 is a perspective view showing prior part.
Figure 7:
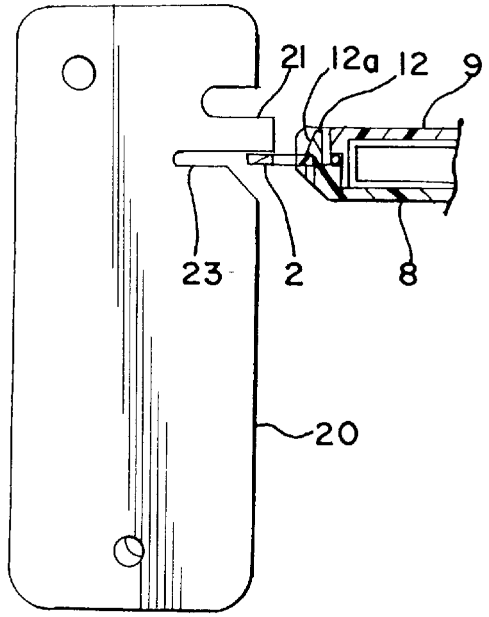
FIG. 7 PRIOR ART
FIG. 7 is a plan view showing the prior art of FIG. 6 in use.
Figure 8:
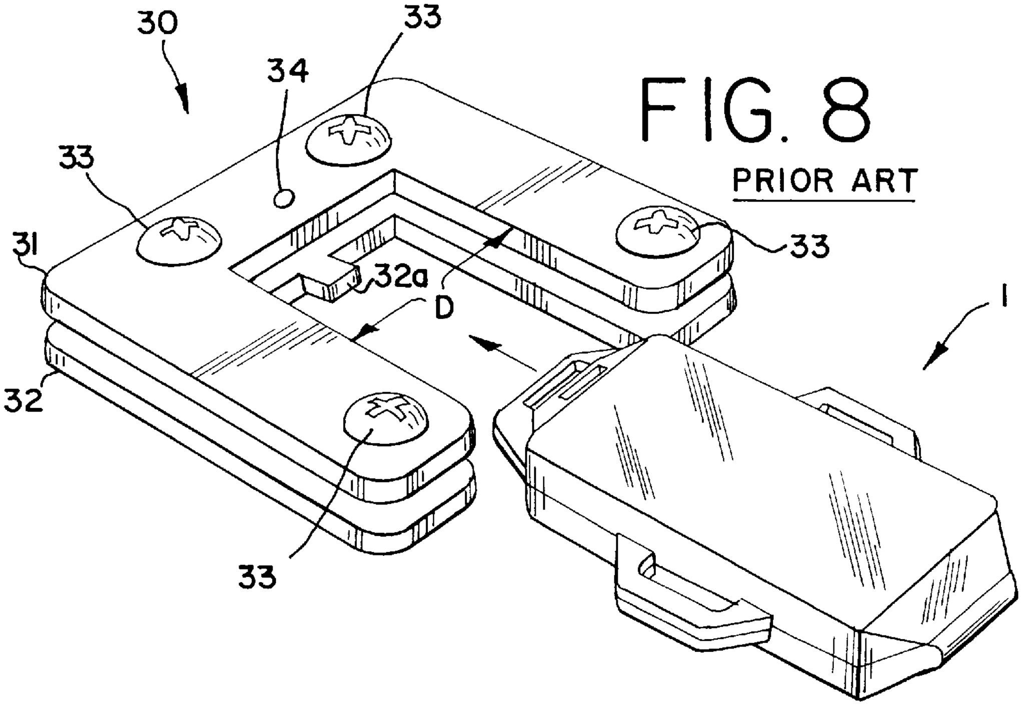
FIG. 8 PRIOR ART
FIG. 8 is a perspective view showing prior art of another type.
Figure 9:
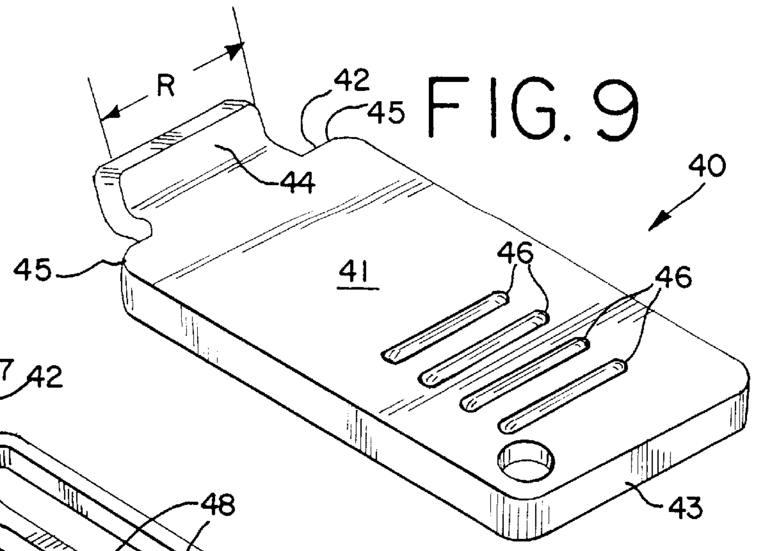
FIGS. 9 and 10 are perspective views showing a preferred embodiment of an unlocking tool in accordance with the present invention.
Figure 10:
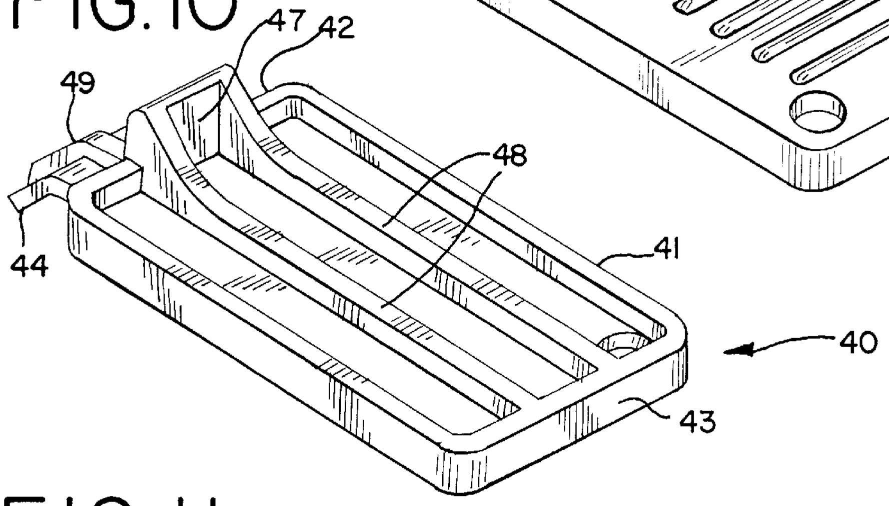
Figure 11:
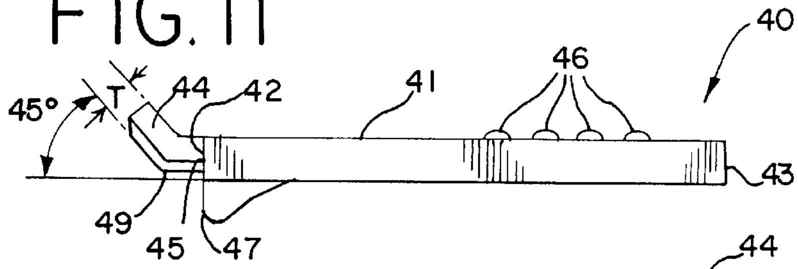
FIG. 11 is a side view showing the embodiment of FIG. 9.

FIGS. 9, 10 and 11 show a preferred embodiment of the unlocking tool in accordance with the present invention. As shown in FIGS. 9, 10 and 11, an unlocking tool 40 is generally a rectangular plate made of a reinforced plastic. The unlocking tool 40 includes a main body portion 41 having a first end 42 and a second end 43. The unlocking tool 40 also includes a curved end portion 44 attached to the first end 42 of the main body portion 41. As best shown in FIG. 11, the curved end portion 44 is curved upward at an angle of about 45 degrees with respect to the main body portion 41. The curved end portion 44 has, as shown in FIG. 9, a width R which is slightly shorter than the length S of the slot 5 of the container 1 and, as shown in FIG. 11, a thickness T which is slightly smaller than the width U of the slot 5, so that the curved end portion 44 can be inserted into the slot 5 with a minimum clearance between them. On the other hand, the main body portion 41 has a width which is wider than the width R of the curved end portion 44. This difference in width between the main body portion 41 and the curved end portion 44 creates shoulders 45 at the first end 42 of the main body portion 41. Provided on the upper surface of the main body portion 41 are four elongated elevations 46 running in the lateral direction at the same intervals. These elevations 46 help an operator hold the unlocking tool 40.

Figure 12:
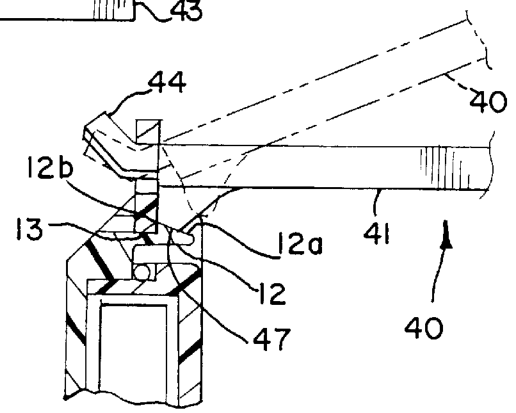
FIG. 12 is a cross-sectional view showing the embodiment of FIG. 9 in use.
Figure 13:
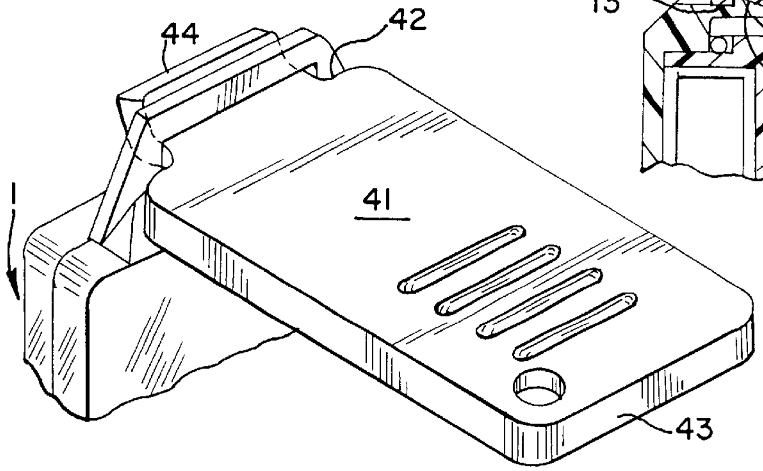
FIG. 13 is a perspective view showing the embodiment of FIG. 9 in use.

Turning over the tool 40 as shown in FIGS. 10, there is a wall 47, sometimes referred to as an urging device, built at the center of the first end 42 of the main body portion 41. The wall stretches laterally for a length which is substantially equal to the width of the slant surface 12*a* of the latch finger 12. There is no definite limitation on the height of the wall 47, but, in this preferred embodiment, the height of the wall 47 is such that the tool 40 comes in a position substantially perpendicular to the container 1 as shown in FIGS. 12 when the curved end portion 44 is fully inserted into the slot 5 of the container 1 and the top of the wall 47 abuts against the slant surface 12*a* of the latch finger 12. The wall 47 is joined by two ridges 48 running longitudinally in parallel to each other for the purpose of reinforcing the wall 47 and the main body portion 41. The curved end portion 44 has similar reinforcing ridges 49 on its back side.

To open the container 1 with the unlocking tool 40, an operator holds the container 1 in one hand and the unlocking tool 40 in the other hand and inserts the curved end portion 44 into the slot 5 of the container 1 until the shoulders 45 of the tool 40 abut against the tab 2 of the container 1. The shoulders 45 function as a stopper to limit the insertion of the curved end portion 44 into the slot 5. Since the end portion 44 is curved, the insertion of the tool 40 is made in such a manner that the tool 40 makes a certain angle with respect to a plane perpendicular to the container 1 as shown by the broken lines in FIG. 12. While holding the container 1 still, the operator then rotates the tool 40 clockwise in FIG. 12 around the slot 5 until the top of the wall 47 comes into contact with the slant surface 12*a* of the latch finger 12.

The operator then applies a force at the second end 43 to further rotate the tool 40 clockwise. When the tool 40 is further rotated, the top of the wall 47 pushes the slant surface 12*a* and thus pushes the latch finger 12 downward in FIG. 12, thereby releasing the engagement between the holding edge 12*b* and the slot 13. Since the surface 12*a* is inclined, a force exerted on the surface 12*a* pushes the latch finger 12 not only downward but also leftward in FIG. 12. Thus, the force exerted on the slant surface 12*a* operates not only to disengage the latch finger 12 from the slot 13 but also to open the container 1. During the rotation of the tool 40, the curved end portion 44 hooks on the periphery of the slot 5 and prevents the curved end portion 44 from coming out of the slot 5.

The above unlocking tool 40 is advantageous over the prior art tools discussed above. First of all, the tool 40 functions as a lever and requires very little force to open the container 1. To effect leverage of the tool 40, the junction between the main body portion 41 and the curved end portion 44 operates as a fulcrum around which the tool 40 rotates; the second end portion 43 operates as an effort point at which a force is applied to rotate the tool 40; and the top of the wall 47 operates as an acting point at which work is done by the rotational movement of the tool 40.

Second, the tool 40 requires virtually no effort to keep the tool 40 properly positioned with respect to the container 1 during the operation. As mentioned above, the shoulders 45 function as a stopper to limit the insertion of the curved end portion 44 into the slot 5. In addition, once the curved end portion 44 is fully inserted into the slot 5, the end portion 44 hooks on the periphery of the slot 5 and prevents the curved end portion 44 from coming out of the slot 5. Thus, the curved end portion 44 and the shoulders 45 function in cooperation as a positioning device to keep the fulcrum properly positioned in the slot 5. Because of this positioning function effected by the curved end portion 44 and the shoulders 45, the tool 40, once fully inserted into the slot 5, has no freedom with respect to the container 1 but to rotate around an axis extending in the slot 5 along its length S.

It is intended that the foregoing description be regarded as illustrative rather than limiting. It is the claims, including all equivalents, which are indented to define the scope of this invention.

What is claimed is:

1. A combination of a container and an unlocking tool for opening the container by the action of a lever, said container comprising:

a) a first member and a second member each having a first end and a second end, said first and second members being connected at their first ends for rotation with respect to each other to close and open said container;

b) a latch finger provided to the second end of said first member;

c) a first hole provided to the second end of said second member for receiving said latch finger and engaging therewith to keep said container closed; and d) a second hole provided to the second end of said second member adjacent to said first hole for suspension of said container, and said unlocking tool comprising:

e) a rigid piece being formed to pass in part through the second hole of said second member, said rigid piece defining a lever along which said rigid piece has an effort point at which force is applied, a fulcrum around which said rigid piece is rotated by the application of force at said effort point and an acting point at which work is done by the rotational movement of said rigid piece;

f) a positioning device provided for said rigid piece for positioning said fulcrum in said second hole; and g) an urging device provided at said acting point for urging said latch finger when said rigid piece is rotated around said fulcrum positioned in said second hole in order to release the engagement between said latch finger and the first hole of said second member.

2. A combination as recited in claim 1, wherein said acting point is located between said fulcrum and said effort point.

3. A combination as recited in claim 2, wherein said positioning device includes a curved end portion formed to pass through said second hole and hook on the periphery of said second hole to hold itself in said second hole when force is applied at said effort point.

4. A combination as recited in claim 3, wherein said curved end portion is curved over about 45 degrees with respect to a plane extending along said lever and perpendicular to a plane in which said rigid piece rotates.

5. A combination as recited in claim 2, wherein said positioning device further includes at least one stopper abutting against said container to limit insertion of said curved end portion into said second hole.

6. A combination as recited in claim 2, wherein said urging device includes a projection for pushing said latch finger to release the engagement between said latch finger and the first hole of said second member.

7. A combination as recited in claim 2, wherein a) said rigid piece is generally in the shape of a rectangular plate having along its length a first end and a second end, said rectangular plate having said acting point adjacent to said first end and said effort point at said second point, said rectangular plate being larger in cross section than the second hole of said second member, b) said positioning device includes a curved plate attached to the first end of said rectangular plate and defining said fulcrum at the junction between said curved plate and the rectangular plate, said curved plate being formed to pass through said second hole and hook on the periphery of said second hole to hold itself in said second hole when force is applied at said second end, c) said positioning device further includes at least one stopper created at the junction between said curved plate and said rectangular plate due to the difference in cross section therebetween, said stopper abutting against the periphery of said second hole to limit insertion of said curved plate into said second hole, and d) said urging device includes a projection for pushing said latch finger to release the engagement between said latch finger and the first hole of said second member.

8. A combination as recited in claim 7, wherein said curved plate is curved over about 45 degrees with respect to said rectangular plate.

9. A method of opening a container by the action of a lever, said container including a first member and a second member each having a first end and a second end, said first and second members being connected at their first ends for rotation with respect to each other to close and open said container, said first member having at its second end a latch finger, said second member having at its second end a first hole for receiving said latch finger and engaging therewith to keep said container closed, and said second member also having a second hole adjacent to said first hole for suspension of said container, said method comprising the steps of:

a) inserting into the second hole of said second member a lever having an effort point at which force is applied, a fulcrum around which said lever is rotated by the application of force at said effort point, and an acting point at which work is done by the rotational movement of said lever;

b) positioning said fulcrum in said second hole; and c) rotating said lever around said fulcrum positioned in said second hole so that said acting point will urge said latch finger to release the engagement between said latch finger and the first hole of said second member.

* * * * *